United States Patent [19]

Nagata et al.

[11] Patent Number: 5,202,724
[45] Date of Patent: Apr. 13, 1993

[54] MICROFILM CAMERA

[75] Inventors: Koichi Nagata, Machida; Keijiro Ishii, Sagamihara; Fumio Fukumoto, Yamato, all of Japan

[73] Assignee: Minolta Camera Kabushiki Kaisha, Osaka, Japan

[21] Appl. No.: 798,113

[22] Filed: Nov. 26, 1991

[30] Foreign Application Priority Data

Nov. 28, 1990 [JP] Japan .................................. 2-327020
Nov. 28, 1990 [JP] Japan .................................. 2-327021

[51] Int. Cl.$^5$ ........................ G03B 27/32; G03B 27/52
[52] U.S. Cl. ................................ 355/64; 354/109; 355/41; 355/50; 355/112
[58] Field of Search ................ 355/41, 50, 64, 112; 354/109, 110, 159

[56] References Cited

U.S. PATENT DOCUMENTS

| | | | |
|---|---|---|---|
| 4,693,591 | 9/1987 | Saijo et al. | 355/41 |
| 4,777,515 | 10/1988 | Aikoh et al. | 355/64 |
| 4,803,505 | 2/1989 | Saijo et al. | 354/80 |
| 4,967,228 | 10/1990 | Ishii et al. | 355/40 |

*Primary Examiner*—Richard A. Wintercorn
*Attorney, Agent, or Firm*—Willian Brinks Olds Hofer Gilson & Lione

[57] ABSTRACT

A microfilm camera comprises a camera head and a document support. The camera head includes a film transport mechanism for intermittently feeding a strip of microfilm past an exposure station at which an aperture plate is disposed. The aperture in the aperture plate is adjustable in one of at least two different sizes by means of a masking flap supported for movement between a first size position, in which a portion of the aperture is shielded, and a second size position in which the masking flap is clear from the aperture. When a document of a relatively small size is placed on the document support, the masking flap is in the first size position, but when a document of a relatively large size is placed on the document support, the masking flap is in the second size position. The camera head also includes a shutter for selectively intercepting and opening an optical path extending through a lens assembly in alignment with the aperture along which imagewise rays of light carrying an image of the document travel towards the microfilm. The microfilm camera also comprises a marking imprint mechanism so designed that, in the case of the microfilmed image of the document of the first size, a single marking is imprinted on the microfilm, but in the case of the microfilmed image of the document of the second size, spaced-apart markings are imprinted on the microfilm.

13 Claims, 10 Drawing Sheets

MICROFILM CAMERA

BACKGROUND OF THE INVENTION

1. Field of the Invention

The present invention relates to a photographic microfilm recording device, or a microfilm camera, for photographically recording a number of images of documents on a microfilm on a reduced scale.

2. Description of the Prior Art

Of numerous photographic microfilm recording devices or microfilm cameras, the microfilm camera has been suggested in which, while the size of a single frame in the microfilm corresponds to the size of a document to be recorded on the microfilm, both of a single-size image and a double-size image can be photographically recorded. In this system, for retrieving purpose, a blip marking is also photographically recorded on the microfilm at a location in the vicinity of and peripheral to each image recorded on the microfilm.

More specifically, with the prior art microfilm camera referred to above, the images are photographically recorded on a reduced scale on the microfilm in a fashion which will now be described with reference to FIG. 13. FIG. 13 illustrates a portion of the microfilm M, i.e., a strip of light sensitive film designed to bear a miniature photographic copy of documents. That portion of the microfilm M is shown to bear a single-size image P1 and a double-size image P2 positioned one after another in a direction lengthwise of the microfilm M.

As shown in FIG. 13, according to the prior art microfilm photographing system now under discussion, a blip marking B is photographically recorded along one side edge of the microfilm M and adjacent one corner of each of the recorded images P1 and P2 on a leading side with respect to the direction of sequence of photographing. In other words, only one blip marking B is photographically recorded at a leading position along one side edge of the microfilm M for each recorded image P1 and P2 regardless of the size of an image area in which the associated image P1 and P2 is recorded. So far shown, the recorded image P1 represents a single-size image of one page, for example, either a B5-size format or an A4-size format, of a book whereas the recorded image P2 represents a double-size image of two pages (and, hence, B4-size format or A3-size format) of the book.

Apart from the above, the Japanese Laid-open Patent Publication No. 60-95525, published in 1985, discloses a microfilm camera system having a capability of photographically recording a number of types of blip markings B. However, even with this prior art microfilm camera system, blip markings B of only selected one of the types can be photographically recorded, one for each image area on the microfilm, along one side edge of the microfilm in a manner similar to that shown in and discussed with reference to FIG. 13.

As is well known to those skilled in the art, images recorded on the microfilm are so miniature that, in most cases, unless the use is made of a microfilm reader or printer or a combined reader and printer, what is expressed in the microfilmed image cannot be legible. Therefore, when one or some of the microfilmed images are desired to be viewed through the microfilm reader or to be copied through the printer, a controller-based retrieval is generally carried out to locate such one or some of the microfilmed images. More specifically, an operator of, for example, the microfilm reader has to input, into a retrieval system, an address of one of the microfilmed images which is desired to be viewed through a screen of the microfilm reader, so that the retrieval system can browse the microfilm to locate such one of the microfilmed images and then to cause it to be displayed through the reader screen. The retrieval system while browsing the microfilm counts the number of the blip markings, one for each microfilmed image, and issues a stop command to interrupt a transport of the microfilm when the count of the blip markings coincide with a particular value assigned by the input address, thereby enabling the particular microfilmed image to be displayed through the reader screen.

Referring again to FIG. 13, where only one blip marking B is allocated to each microfilmed image P1 or P2 regardless of the size of the image area thereof on the microfilm M, a problem has been encountered in that a desired portion of the double-size image P2, i.e., the image microfilmed in a size double the single-size image P1, cannot be easily retrieved and complicated and time-consuming procedures are required to make that desired portion of the double-size image P2 displayed through the reader screen. In the case of the prior art microfilm camera specifically designed for use with documents such as books, a two-page spread of a book representing the double-size image of B4-size or A4-size format is photographed on a reduced scale as shown by the double-size image P2, with one blip marking B photographically recorded for that double-size image P2. Therefore, the retrieval on page basis requires a preparatory calculation to determine how many pages are to be transported to a desired page of the microfilmed transcript of the book to locate the desired page, followed by a manual procedure to bring the image of the desired page in register with the reader screen.

By way of example, let it be assumed that the microfilm bears a series of the single-size image P1 corresponding to page 1 of a book and the double-size images P2 corresponding to the subsequently succeeding pages of the book and that the user wishes to view a microfilmed image of page 9 of the book. According to the prior art system, when such microfilm is placed on the microfilm reader having the controller-based retrieval system, the user has to calculate either from memory or by heart how many blip markings have been recorded from the first blip marking corresponding to the microfilmed image of page 1 to that of page 9 and then to input an address value of 5 corresponding to the number of the blip markings calculated from the microfilmed image of page 1 to that of page 9. The inputting of the address value of 5 will result in a display, on the reader screen, of the microfilmed image of page 8 partly because page 8 and page 9 of the book form a two-page spread recorded on a single image area and partly because the corresponding blip marking has been recorded at a position along one side edge of the microfilm and adjacent a corner of that image area on the leading side with respect to the direction of sequence of photographing. Once the microfilmed image of page 8 has thus been displayed on the reader screen, the user then has to make an manual adjustment to bring the microfilmed image of page 9 in position ready to be displayed through the reader screen. This is indeed complicated and time-consuming.

SUMMARY OF THE INVENTION

The present invention has been devised with a view to substantially eliminating the above discussed problems hitherto encountered and is intended to provide an improved microfilm camera wherein, for each double-size image, two blip markings spaced a predetermined distance from each other can be photographically recorded on a microfilm, thereby to facilitate the subsequent image retrieval.

In order to accomplish the foregoing object of the present invention, the microfilm camera is of a type capable of photographically making a series of single-size and double-size recordings on one microfilm and provided with a photographic marking mechanism for photographically imprinting a marking for each recording on the microfilm at a location adjacent and peripheral to such recording. The photographic marking mechanism is so designed that, in the case of the single-size recording being photographically made, a single marking is imprinted on the microfilm at a location along one side edge of the microfilm and adjacent the single-size recording, but in the case of the double-size recording being photographically made, two spaced-apart markings are imprinted on the microfilm at respective locations along the side edge thereof and adjacent single-size fractions of the double-size recording, respectively.

Thus, it will readily be seen that, according to the present invention, depending on the size of each image area on the microfilm, one or more markings, for example, blip markings, are photographically imprinted. Specifically, one blip marking is imprinted for each single-size image whereas two or more blip markings are imprinted for each double-size image in spaced relationship with each other. Accordingly, when the microfilm bearing the series of the microfilmed images photographed according to the present invention is placed on the microfilm reader, the retrieval of a desired one of the microfilmed images can readily be accomplished with no need for the user to do a calculation from memory or by heart. This in turn eliminates the need to do such a manual adjustment hitherto required to bring the right microfilmed image into the right position.

Thus, it is a related object of the present invention to provide a microfilm bearing not only at least one microfilmed image, but also one or more markings formed by the use of the unique microfilm camera.

The microfilm camera according to the present invention may be equipped with an automatic document feed mechanism. The use of the automatic document feed mechanism is particularly advantageous where the documents to be microfilmed are in a sheet-like form.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Figure 1:
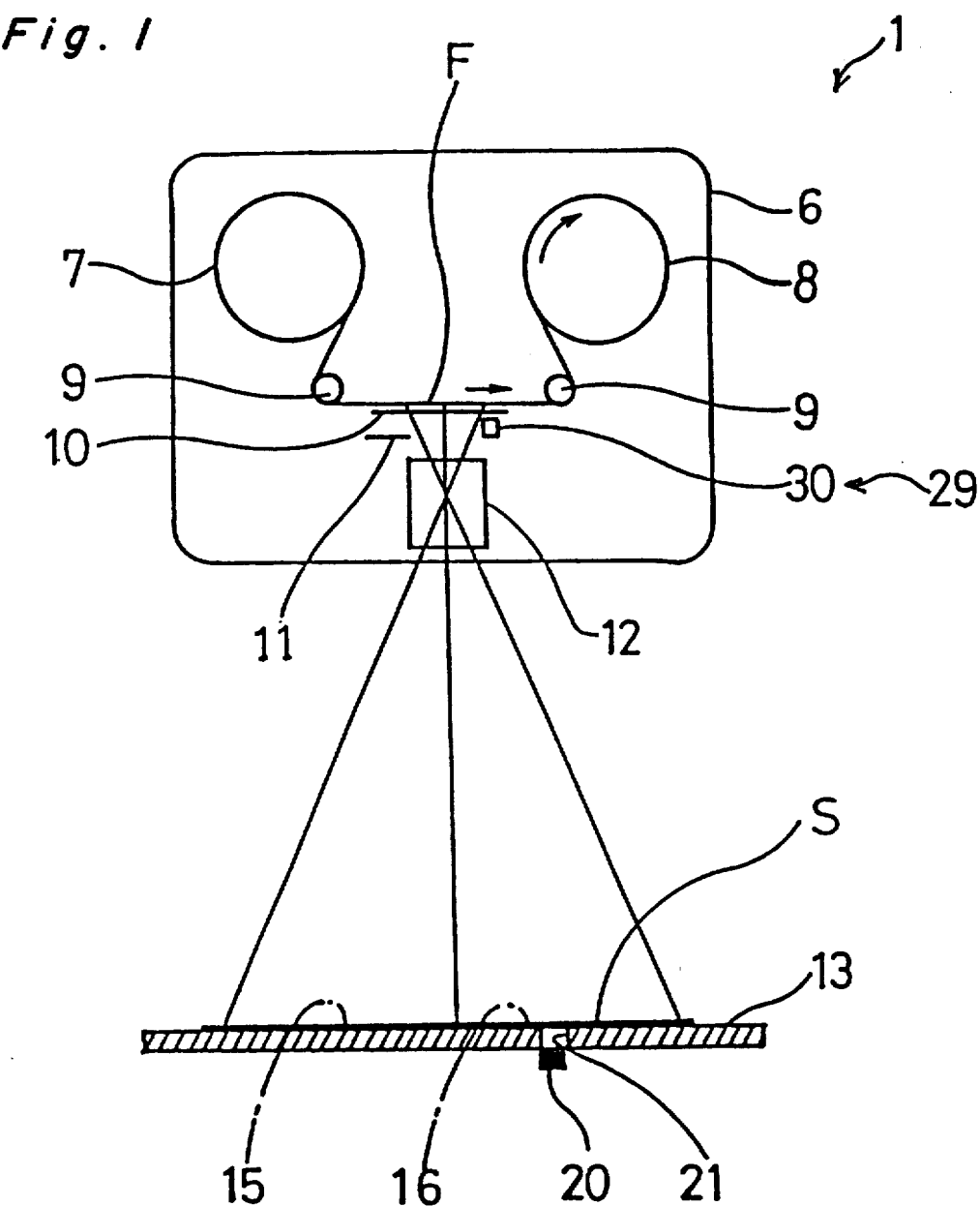
FIG. 1 is a schematic front sectional view of a microfilm camera according to the present invention.
Figure 2:
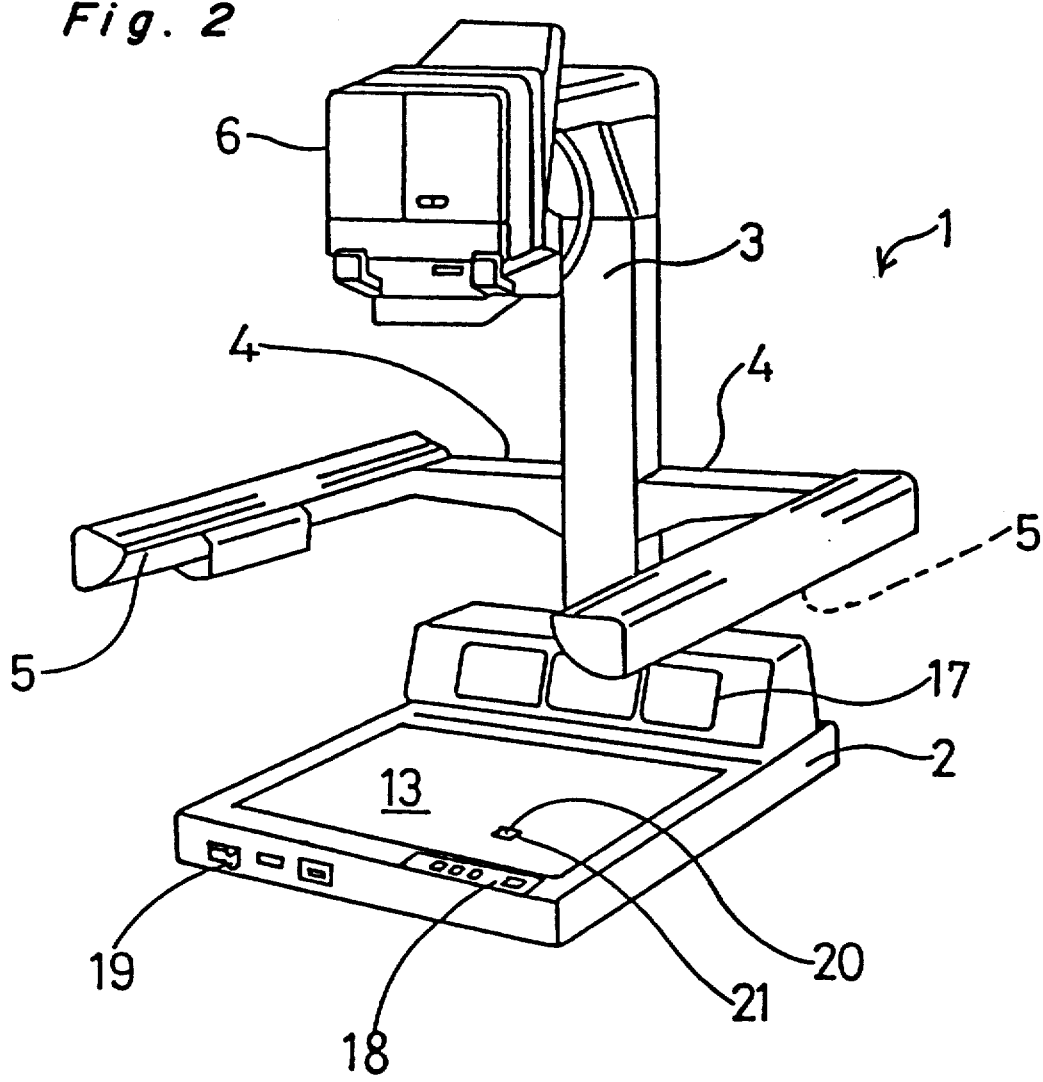
FIG. 2 is a schematic perspective view of the microfilm camera shown in FIG. 1.

Referring first to FIGS. 1 and 2, a microfilm camera generally identified by 1 is, so far shown, employed in the form of a planetary camera or so-called planner-type camera and is so designed that an actual photo-taking can take place while both of a document S to be microfilmed and a photosensitive microfilm F are held still.

The microfilm camera 1 comprises a generally rectangular base 2 having a pair of long side edges and a pair of short side edges and also having a support column 3 erected so as to extend upwardly from a generally intermediate portion of one of the long side edges of the base 2. The support column 3 has a pair of arms 4 extending from a substantially intermediate portion of the support column 3 in a direction away from each other, and a generally elongated illuminator lamp 5 is mounted on each of the arms 4 so as to occupy a position generally above the associated short side edge of the base 2. A camera head 6 is mounted atop the support column 3 and comprises a camera housing of a generally box-like configuration.

Within the camera housing, there is accommodated a film supply reel 7 around which a strip of photosensitive film forming the microfilm F is rolled, a film wind-up reel 8, intermediate feed rollers 9 disposed in spaced relation to each other along the path of transport of the microfilm F from the supply reel 7 towards the wind-up reel 8, an aperture plate 10 positioned intermediate between the intermediate feed rollers 9, a shutter 11 supported generally below the aperture plate 10, and a lens assembly 12 disposed immediately below the aperture plate 10.

When a microfilm recording is to be made, each of frames of the microfilm F being transported from the supply reel 7 onto the wind-up reel 8 is held still at a position immediately above the aperture plate 10 and is registered through an aperture (identified by 24 in FIGS. 6 to 8) in the aperture plate 10 and then through the lens assembly 12 with a document S placed on the base 2 as will be described later. The shutter 11 is adapted to selectively open and intercept an optical path between each frame of the microfilm F and the lens assembly 12. It is to be noted that the size of each frame of the microfilm F is determined by the size of the aperture 24 in the aperture plate 10 and is variable to accommodate both of a single-size image and a double-size image as will become readily apparent from the subsequent description.

The base 2 has a document support table 13 mounted fixedly thereon and positioned immediately below a space delimited between the illuminator lamps 5 so that the document S placed thereon can be illuminated by illuminator lamps 5. The base 2 also has a generally elongated control console 17 mounted thereon so as to extend on respective sides of the support column 3, a control panel 18 positioned along the other long side edge thereof, and a power supply switch 19.

Figure 5:
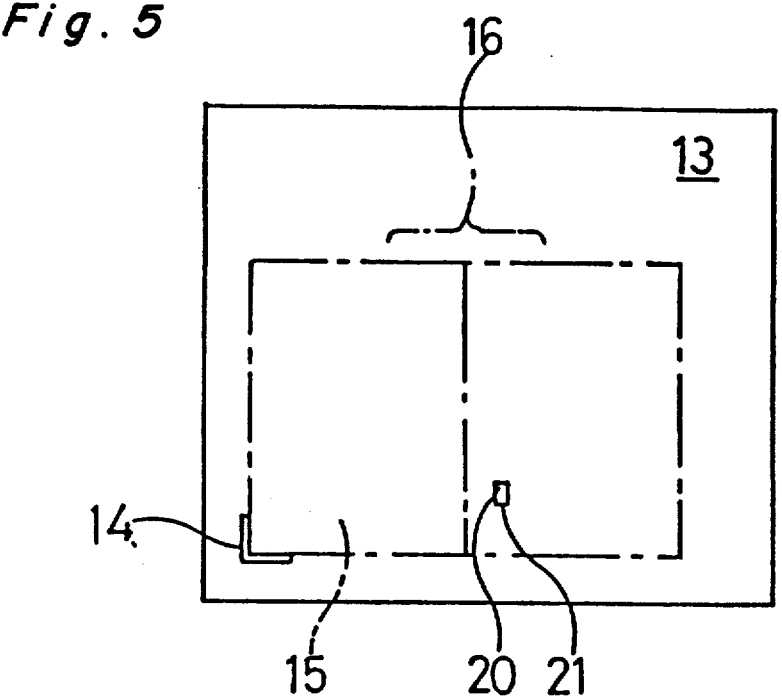
FIG. 5 is a schematic top plan view of the document support table.

The document support table 13 has a sensor window 21 defined for the purpose which will become clear from the subsequent description and also has a generally L-shaped corner place 14 adapted to receive one of four corners of the document S when the latter is placed thereon in readiness or the actual microfilm recording, i.e., actual photographing of a document image to form a microfilmed image of the microfilm F. This corner piece 14 is utilized at the time of placement of the document on the support table 13 regardless of the size of the document S and, therefore, as shown in FIG. 5, when the document of a single size, i.e., of a predetermined size, such as B5 or A4 size, and the document of a double size, i.e., of a size double the predetermined size, such as B4 or A3 size, are placed, one at a time, on the support table 13 with one corner thereof abutting against the corner piece 14, the support table 13 will have a single-size document area 15 and a double-size document area 16.

When in use, the illuminator lamps 5 illuminate the document S placed on the document support table 13 and imagewise rays of light reflected from the document S travel towards the camera head 6. If at this time the shutter 11 is in an open position clearing the optical path between the lens assembly 12 and the aperture 24 in the aperture plate 10, one of the frames of the microfilm F then aligned with the aperture in the aperture plate 10 is exposed to the imagewise rays of light which are, after having entered the camera head 6, travelling towards the microfilm F through the lens assembly 12 and then through the aperture 24 in the aperture plate 10. In this way, that frame of the microfilm F bears a latent image corresponding to an image on the document S which will subsequently develop into a negative or positive microfilmed image P (identified in FIG. 12) when the microfilm F completely wound up around the wind-up reel 8 is developed.

Figure 3:
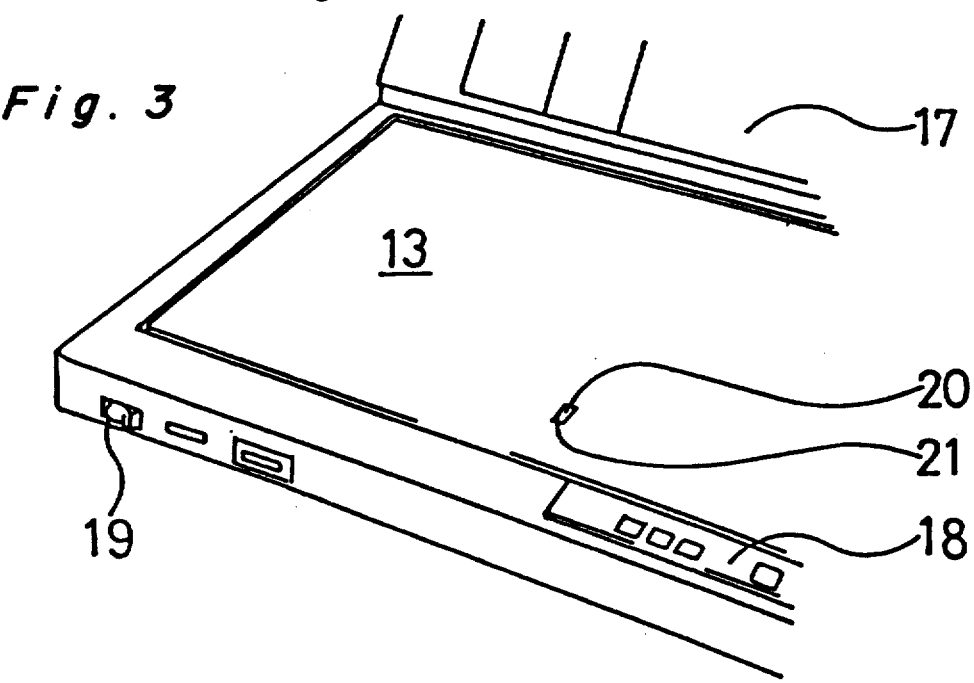
FIG. 3 is a schematic fragmentary perspective view, on an enlarged scale, of a document support table of the microfilm camera which is equipped with a size detector.

The microfilm camera according to the present invention is equipped with a document size detector means for detecting, and providing an output signal indicative of, the size of the document actually placed on the document support table 13. The details of this document size detector means will now be described with particular reference to FIGS. 3 to 5. The document size detector means comprises a size sensor 20 is adapted to detect the size of the document S placed on the document support table 13 and is employed in the form of a photoelectric detector comprising a light emitter and a light receiver juxtaposed to each other in a single detector casing so that the light receiver can sense a beam of light emerging from the light emitter.

Figure 4A:
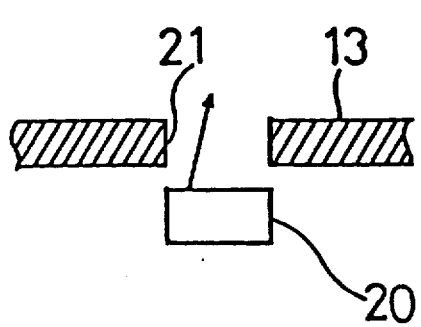
FIG. 4(a) is a schematic sectional view of the size detector held in position to detect the presence of a document on the document support table.
Figure 4B:
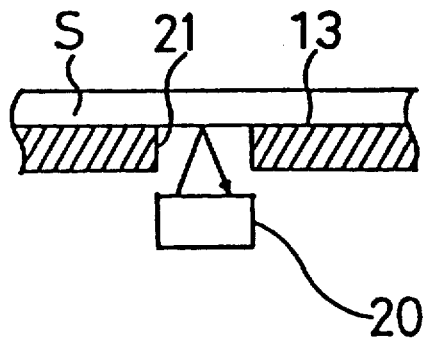
FIG. 4(b) is a schematic sectional view of the size detector held in position to detect the presence of a document on the document support table.

The size sensor 20 is secured to an undersurface of the document support table 13, or supported otherwise in any suitable manner below the document support table 13, in register with the sensor window 21 which is defined in the document support table 13 at a location bound with in the double-size document area 16, but outside and adjacent to the single-size document area 15. In this arrangement, if the double-size document S is placed on the document support table 13 with a portion thereof overlaying the sensor window 21 as shown in FIG. 4(b), the beam of light emitted from the light emitter forming a part of the size sensor 20 can be reflected from that portion of the document S to the light receiver, but if the single-size document S is placed on the document support table 13 with the sensor window 21 left open, the beam of light from the light emitter does not reach the light receiver as shown in FIG. 4(a). Thus, the size sensor 20 is, for the purpose of description of the present invention, assumed to be switched on only when the beam of light from the light emitter is received by the light receiver after having been reflected from the double-size document S, that is, during the presence of the double-size document S on the document support table 13, if and so long as the sensor window 21 is covered even though the document has been placed on the document support table 13, such document is deemed to be a single-size document and, in such case, the size sensor 20 is held switched off.

It is to be noted that, in the practice of the present invention, instead of the photoelectric detector, an ultrasonic detector, a limit switch or any other detector may be employed for the size sensor 20.

Figure 6A:
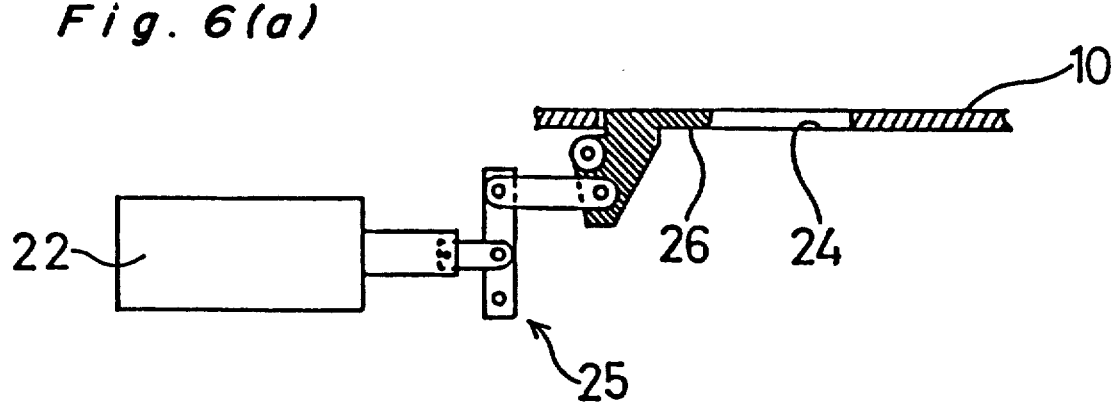
FIG. 6(a) is a schematic side view, with a portion shown in section, showing a masking flap and an associated switching solenoid assembly, said masking flap being shown in one operative position.
Figure 6B:
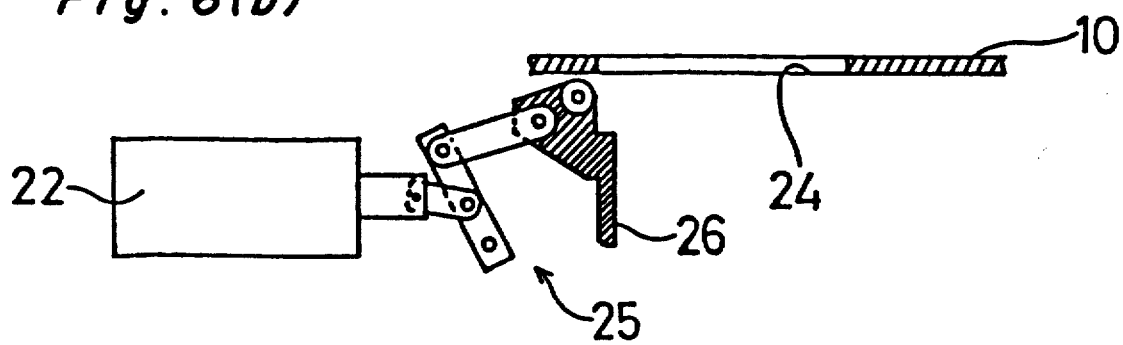
FIG. 6(b) is a view similar to FIG. 6(a), showing the masking flap held in a different operative position.
Figure 7:
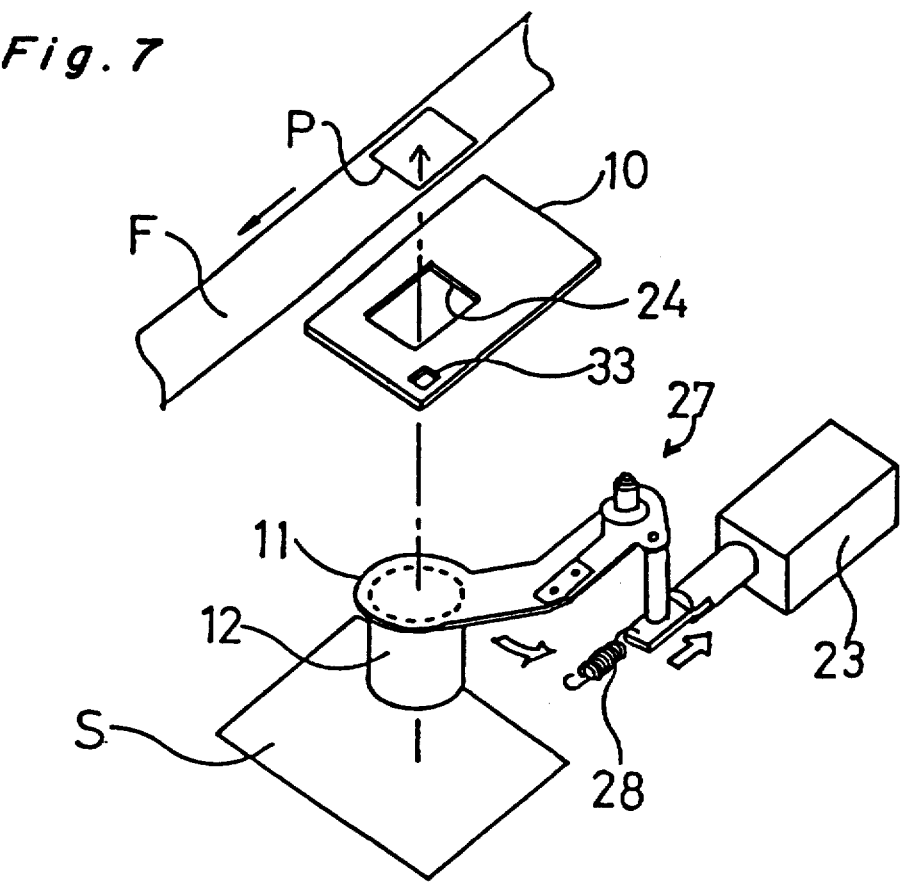
FIG. 7 is a schematic perspective view showing a shutter and a solenoid assembly associated with the shutter.

Referring now to FIGS. 6 and 7, the details of the aperture plate 10 and the shutter 11 will be described. As best shown in FIGS. 6(a) and 6(b) has a generally rectangular aperture 24 defined therein and having a longitudinal axis lying substantially parallel to the direction of transport of the microfilm F. As hereinbefore discussed, the size of each frame of the microfilm F has been described as variable to accommodate both of a single-size image and a double-size image. For this purpose, one of substantial halves of the aperture 24 divided along a line drawn generally intermediate of the length of the aperture 24 is adapted to be selectively closed and opened by a masking flap 26. This masking flap 26 is hingedly supported for movement between a single-size position as shown in FIG. 6(a) and a double-size position as shown in FIG. 6(b) and is drivingly coupled with a switching solenoid unit 22 through a linkage 25.

The switching solenoid unit 22 may be electrically associated with the size sensor 20 so that, when and so long as the size sensor 20 is switched on having detected the presence of the double-size document S on the document support table 13, the masking flap 24 can be pivoted to the double-size position as shown in FIG. 6(b) thereby clearing the aperture 24 in its entirety, allowing the microfilmed double-size image P2 to be eventually obtained, but when and so long as the single-size document S is placed on the document support table 13 with the size sensor 20 consequently switched off, the masking flap 26 can be pivoted to the single-size position as shown in FIG. 6(a) with that portion of the aperture 24 masked, allowing the microfilmed single-size image P1 to be eventually obtained. Thus, each frame of the microfilm F in which the microfilmed image is eventually formed varies with the effective opening of the aperture 24 in the aperture plate 10 that is controlled by the selective position of the masking flap 26.

As best shown in FIG. 7, the shutter 11 adapted to selectively open and intercept the optical path between the lens assembly 12 and the microfilm F is drivingly coupled with a shutter solenoid unit 23 through a linkage 28. This shutter 11 is normally biased to a closed position, intercepting the optical path, by the action of a biasing spring 28 included in the linkage 27. The shutter solenoid unit 23 is controlled subsequent to the adjustment of the effective opening of the aperture 24 in the aperture plate 10 by means of the masking flap 26.

The marking imprint mechanism is generally identified by 29 and will now be described in detail with particular reference to FIG. 8. The marking imprint mechanism 29 is used to imprint a blip marking B on one side edge of the microfilm F and adjacent to and peripheral to each frame of the microfilm F where a corresponding microfilmed image is eventually formed. Specifically, in the case where the single-size document is photographed, one blip marking B is photographically imprinted on a portion (this portion being hereinafter referred to as a "channel region") of the side edge of the microfilm F and adjacent to and peripheral to the corresponding frame of the microfilm F where the microfilmed single-size image P1 is eventually formed, whereas in the case of the double-size document having been photographed, two blip markings B are photographically sequentially imprinted on two spaced portions or channel regions of the side edge of the microfilm F and adjacent to and peripheral to the corresponding frame of the microfilm F where the microfilmed double-size image P2 is eventually formed.

The marking imprint mechanism 29 includes a light emitting diode (LED) 30 for emitting an imprint beam of light, a condenser lens 32, a reflecting mirror 30 for reflecting the imprint beam towards the condenser lens 32, all those elements being housed within the camera head 6. The imprint beam of light from the light emitting diode 30 and emerging outwardly from the condensor lens 33 passes through an imprint window 33, defined in the aperture plate 10 adjacent to and peripheral to the aperture 24, radiates that portion of the microfilm F to eventually form the blip marking B as shown in FIG. 8. The imprint window 33 in the aperture plate 10 is so defined and so positioned as to occupy a position which is adjacent to and on a downstream side of the aperture 24 with respect to the direction of transport of the microfilm F from the supply reel 7 onto the wind-up reel 8 and which is in register with any one of the channel regions of the microfilm F.

Figure 12:
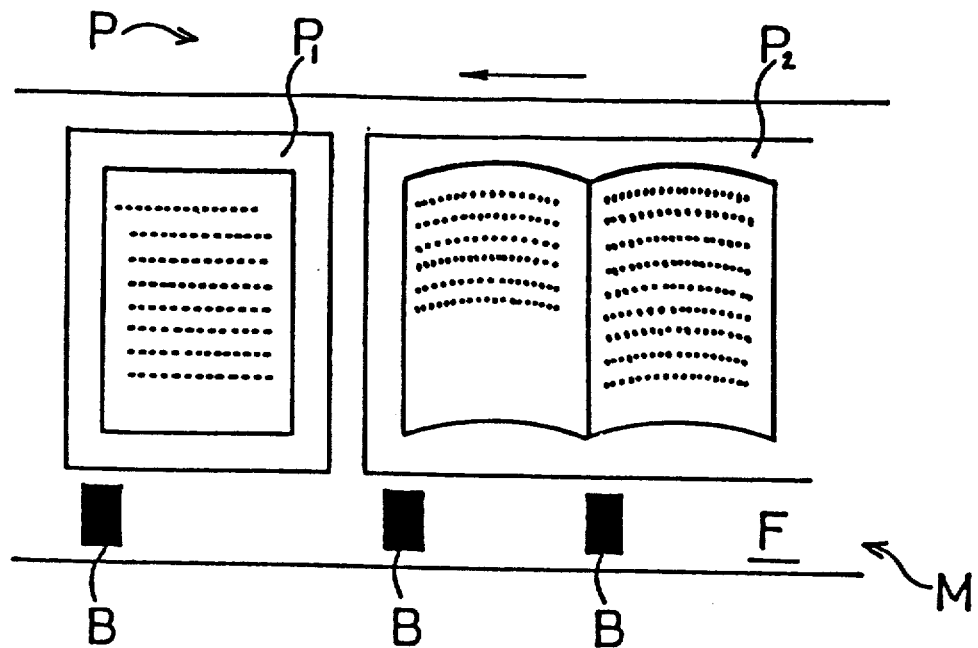
FIG. 12 is a schematic diagram showing a portion of images photographically recorded on the microfilm according to the present invention.
Figure 13:
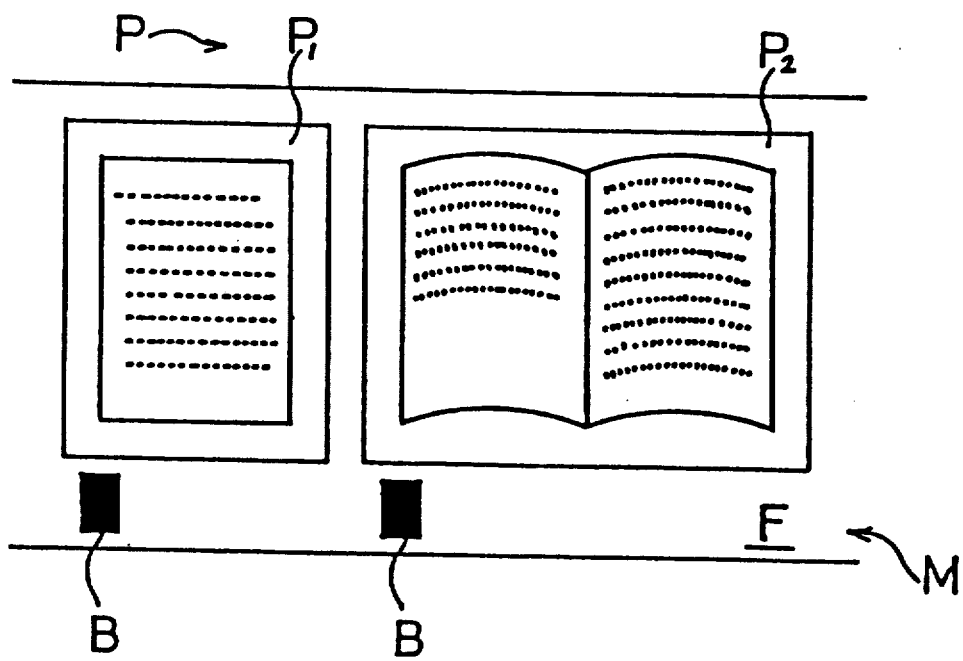
FIG. 13 is a diagram similar to FIG. 11, showing the portion of the images photographically recorded on the microfilm according to the prior art system.

Referring particularly to FIG. 12, the position of the imprint window 33 in the aperture plate 10 relative to the incoming imprint beam of light is so chosen that, regardless of the size of the microfilmed image, one blip marking B can occupy a marginal portion of the microfilm F which is delimited between one side of the microfilm F and the corresponding frame and which is on a leading side of such corresponding frame with respect to the direction of transport of the microfilm F. However, in the case of the microfilmed double-size image P2, an additional blip marking B is imprinted in the same marginal portion of the microfilm F, but at a location spaced a predetermined distance from the blip marking B on the leading side of the microfilm F and generally intermediate of the width of the associated frame of the microfilm F. The predetermined distance referred to above is preferably chosen to correspond to the width of one leaf of the document where the latter is a book and the microfilmed double-size image P2 is that of the two facing pages of the book.

Figure 10:
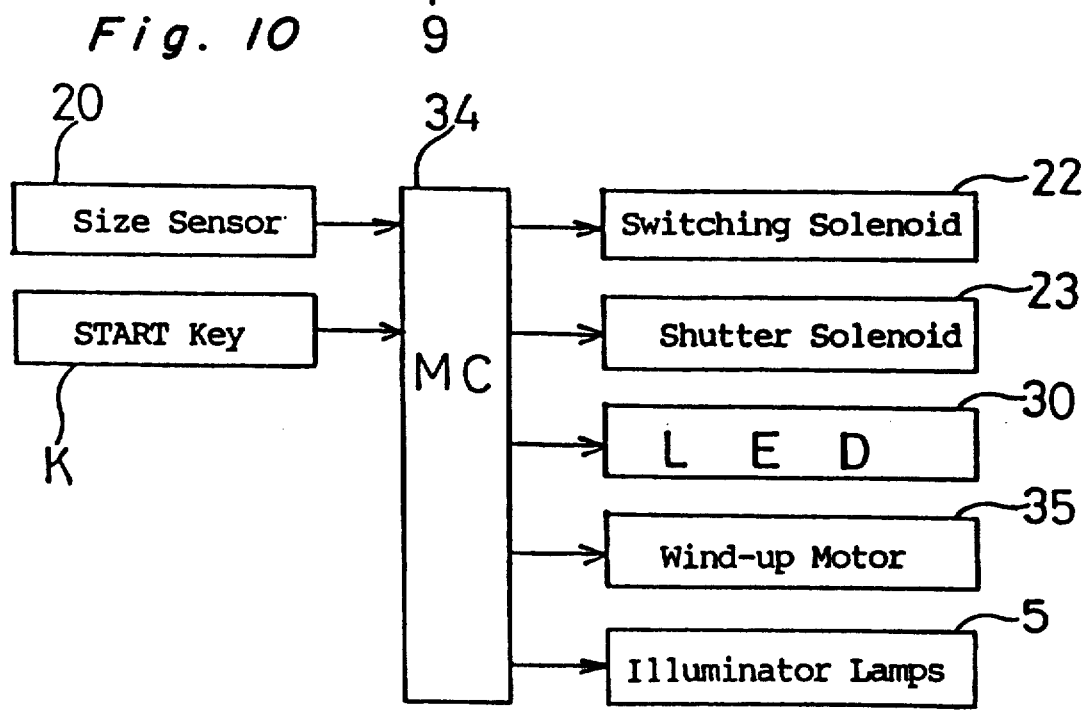
FIG. 10 is a block circuit diagram showing a control means used in the microfilm camera of the present invention.

The light emitting diode 30 forming a part of the marking imprint mechanism 29 is controlled by a drive signal generated from a microcomputer (MC) 34, shown in FIG. 10, in dependence on the detection of the size of the document placed on the document support table 13, that is, the status of the size sensor 20. Specifically, when each channel region of the microfilm F is brought into register with the imprint window 33 on the aperture plate 10 as a result of an intermittent transport of the microfilm F in one direction from the supply reel 7 towards the wind-up reel 8 subsequent to the actual photographing, the light emitting diode 30 is lit for a predetermined length of time to imprint the associated blip marking B. The predetermined length of time during which the light emitting diode 30 is lit may be adjustable to provide the imprinted blip marking B of varying size, for example, large, medium and small. So far shown in FIG. 12, all of the imprinted blip markings B are of uniform size.

Where a microfilm wind-up motor 35 (FIGS. 9 and 10) for winding up the microfilm F around the wind-up reel 8 is employed in the form of a pulse-controlled stepper motor, the position at which the imprinting is carried out can readily be set by the count value obtained by counting the number of pulses inputted to the wind-up motor 35. The microcomputer 34 serving as a control means for the microfilm camera 1 has respective input ports for receiving an output signal from the size sensor 20 and a START signal from a START key K disposed on the control panel 18 and adapted to be manipulated when an actual photographing is to take place. In reference to the output signal from the size sensor 20 and the START signal from the key K, the microcomputer 34 performs a required calculation and outputs through a drive circuit device to respective commands to the switching solenoid unit 22, the shutter solenoid unit 23, the light emitting diode 30 and the microfilm wind-up motor 35.

Figure 9:
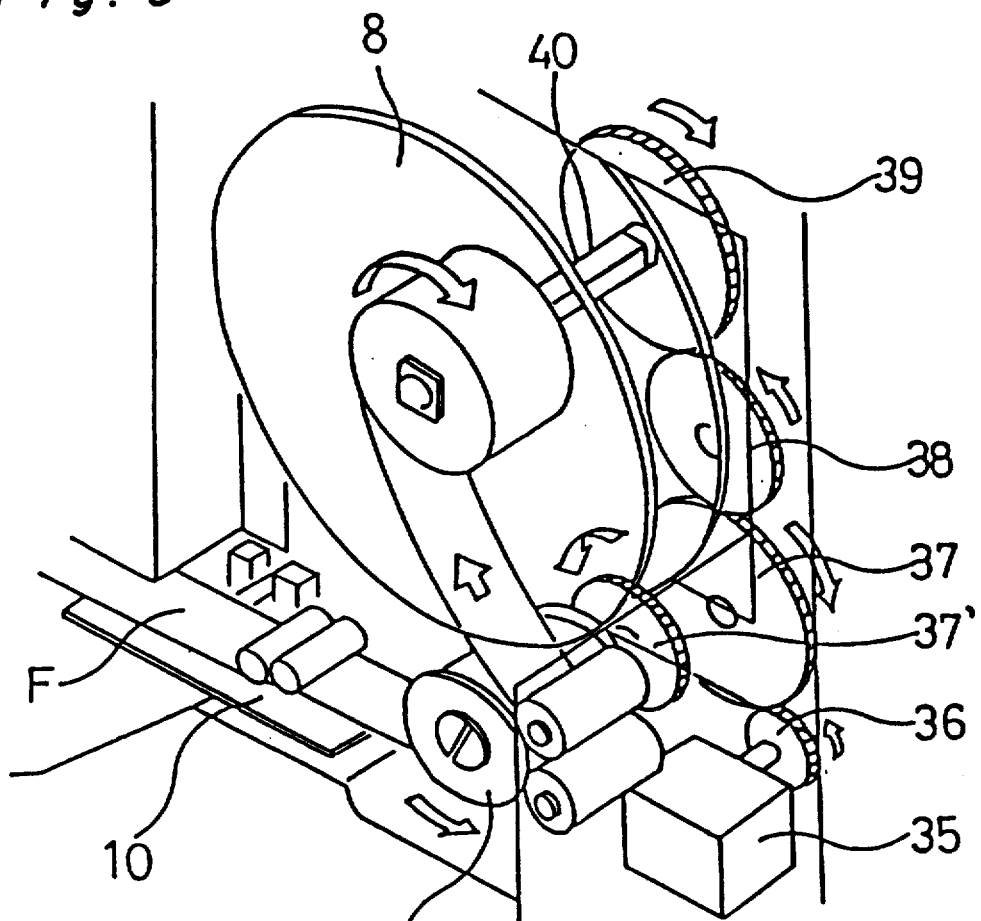
FIG. 9 is a schematic perspective view, on an enlarged scale, showing a microfilm and an associated microfilm wind-up motor.

Referring to FIG. 9, the microfilm wind-up motor 35 is housed within the camera head 6 and has a drive shaft on which a gear 36 is mounted for rotation together therewith. The gear 36 is meshed with a gear 37 with which a feed roller 9 is drivingly coupled through a gear 37' meshed therewith. The gear 37 is also meshed through an intermediate gear 38 with a gear 39 to which the wind-up reel 8 is coaxially coupled for rotation together therewith. Thus, when the wind-up motor 35 is driven, the feed roller 9 and the wind-up reel 8 are rotated in unison with each other to wind up the microfilm F from the supply reel 7 onto the wind-up reel 8.

With the microfilm camera 1 of the above described construction, it will readily be seen that, as shown in FIG. 12, the microfilm F when developed bears a series of microfilmed images P, each descriptive of an image of the document S in either single size or double size, together with the blip markings B one for each frame of the microfilm F. As described above, the number of blip markings B is one for the microfilmed single-size image P1, but two for the microfilmed double-size image P2, and each two blip markings B for the microfilmed double-size image P2 are spaced the predetermined distance from each other in a direction lengthwise of the microfilm F.

Figure 11:
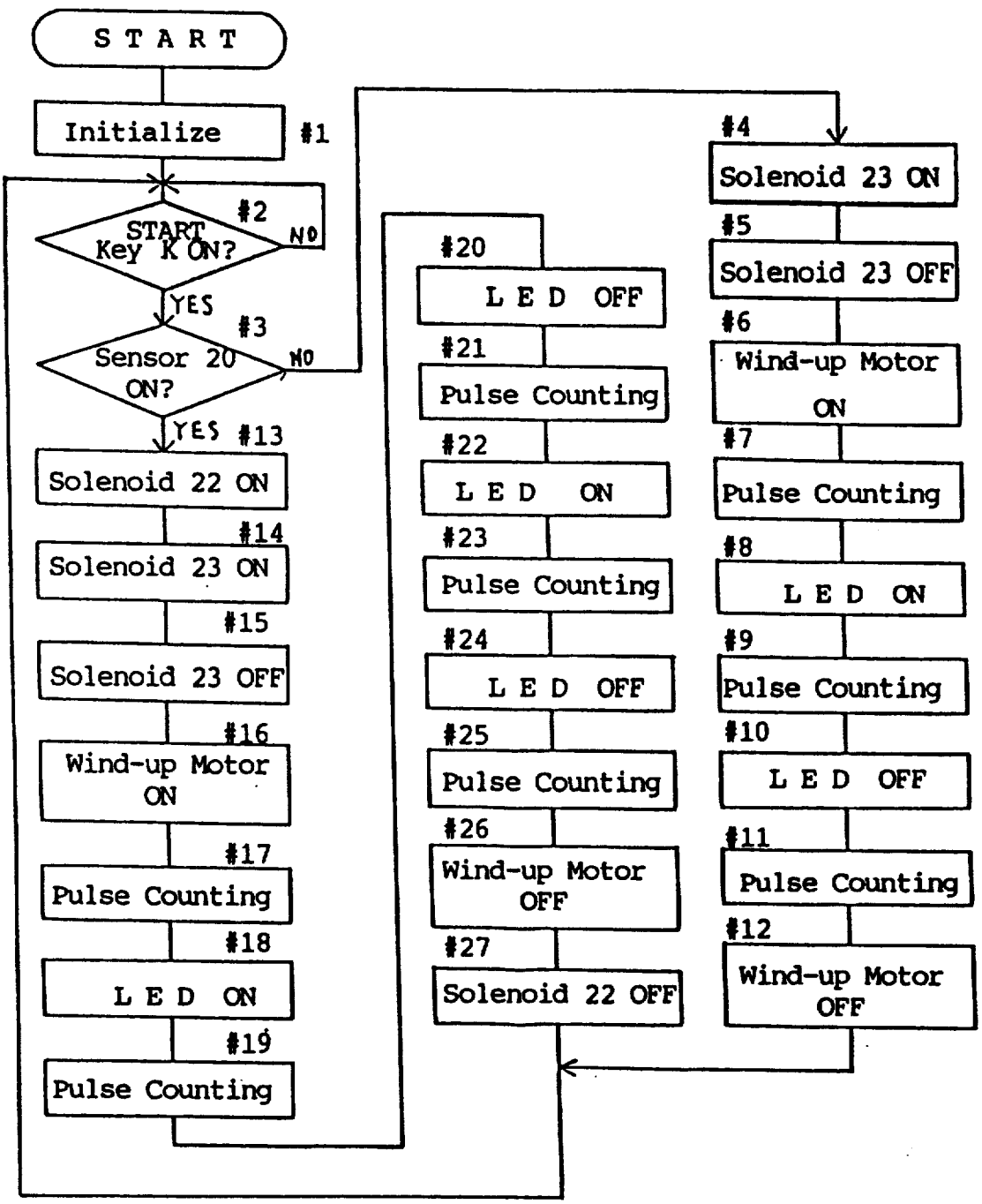
FIG. 11 is a flowchart showing the sequence of control performed by the control means shown in FIG. 10.

Reference will now be made to FIG. 11 showing the sequence of operation of the control means for controlling the microfilm camera 1.

Subsequent to the power switch 19 having been switched on, initialization takes place at step #1. Then at step #2, a decision is made to determine if the START key K has been switched on and, unless the START key K is switched on, a wait is made until the key K is switched on. If the key K is switched on, the program flow goes to step #3 at which another decision is made to determine if the size sensor 20 has been switched on.

Should step #3 indicate that the size sensor 20 is held off, that is, the single-size document S has been placed on the document support plate 13 to cover up the single-size document area 15, a program flow from step #4 to step #12 takes place. In other words, in the event that the single-size document S is placed on the support table 13, the shutter solenoid unit 22 is sequentially switched on and off at respective steps #4 and #5 to bring the shutter 11 to the open position and then back to the closed position, respectively. During a period in which the shutter 11 is in the open position, a frame of the microfilm F then aligned with the aperture 24 in the aperture plate 10 is exposed to the imagewise rays of light originating from the illuminator lamps 5 and, after having been reflected from the document S, reaching the microfilm F through the lens assembly 12 and then through the aperture 24. At this time, the effective opening of said aperture 24 has been adjusted to a value appropriate to the photographing of the single-size document S with the masking flap 26 held at the single-size position as shown in FIG. 6(a). In this way, the single-size image P1 is microfilmed on that frame of the microfilm F.

After the microfilming, step #6 takes place at which the wind-up motor 35 employed in the form of a stepper motor is switched on to cause the feed roller 9 and the wind-up reel 8 to wind up the microfilm a distance corresponding to the width of the frame of the microfilm F in which the microfilmed single-size image P1 is eventually formed. During the sequence from step #7 to step #8, a single blip marking B is imprinted.

Specifically, at step #7, the number of pulses applied to the wind-up motor 35 by the time the channel region of the microfilm F associated with that frame in which the microfilmed single-size image P1 is eventually formed is brought into register with the imprint window 33 in the aperture plate 10 is counted, followed by the light emitting diode 30 of the imprint mechanism 2 being switched on at step #8. The light emitting diode 30 once switched on at step #8 is switched off at step #10 after, consequent upon the counting of the number of pulses applied to the wind-up motor 35 at step #9, the microfilm F has been wound up a distance corresponding to the width of that frame. In this way, the blip marking B associated with the microfilmed single-size image P1 can be imprinted in the channel region of the microfilm F being transported as shown in FIG. 12.

Then, when the wind-up motor 35 has been switched off at step #12 after the number of pulses applied thereto has been counted at step #11, the microfilm F is advanced a distance corresponding to the width of that frame in which the microfilmed single-size image P1 is subsequently formed together with the blip marking B. Thereafter, the program flow returns to step #2.

On the other hand, should step #3 indicate that the sensor 20 is switched on, that is, the double-size document S has been placed on the document support table 13 so as to cover up the double-size document area 16, the flow from step #13 to step #27 takes place.

Referring to step #13 subsequent to the decision step #3, the switching solenoid unit 22 is switched on to cause the masking flap 26 to pivot from the single-size position to the double-size position, clearing the aperture 24 in the aperture plate 10 in its entirety. Then, at successive steps #14 and #15, the shutter solenoid unit 22 is sequentially switched on and off to bring the shutter 11 to the open position and then back to the closed position, respectively. During a period in which the shutter 11 is in the open position, another frame of the microfilm F then aligned with the aperture 24 in the aperture plate 10 is exposed to the imagewise rays of light originating from the illuminator lamps 5 and, after having been reflected from the document S, reaching the microfilm F through the lens assembly 12 and then through the aperture 24. At this time, the effective opening of said aperture 24 has been maximized to a value appropriate to the photographing of the double-size document S with the masking flap 26 held at the double-size position as shown in FIG. 6(b). In this way, the double-size image P2 is microfilmed on that frame of the microfilm F.

Thereafter, at step #16, the wind-up motor 35 is switched on to cause the feed roller 9 and the wind-up reel 8 to advance the microfilm F a distance corresponding to the width of that frame in which the microfilmed double-size image P2 is eventually formed. During an execution of the flow from step #17 to step #20, one blip marking B is imprinted on one of the channel regions of the microfilm F associated with the microfilmed double-size image P2 in a manner similar to that described in connection with the execution of the flow from step #7 to step #10. Specifically, at step #17, the number of pulses applied to the wind-up motor 35 by the time one of the channel regions of the microfilm F associated with that frame in which the microfilmed double-size image P2 is eventually formed is brought into register with the imprint window 33 in the aperture plate 10 is counted, followed by the light emitting diode 30 being switched on at step #18. The light emitting diode 30 once switched on at step #18 is switched off at step #20 after, consequent upon the counting of the number of pulses applied to the wind-up motor 35 at step #19, the microfilm F has been wound up a distance corresponding to the width of that frame. In this way, one of the blip markings B associated with the microfilmed double-size image P2 can be imprinted in the corresponding channel region of the microfilm F being transported as shown in FIG. 12.

Thereafter, during an execution of the flow from step #21 to step #24, the other one of the two blip markings B associated with the microfilmed double-size image P2 can be imprinted on the other of the channel regions of the microfilm F in the vicinity of the frame where that microfilmed double-size image P2 is eventually formed. This flow from step #21 to step #24 is substantially similar to the flow from step #7 to step #10 or the flow from step #17 to step #20. Specifically, at step #21, the number of pulses applied to the wind-up motor 35 by the time the other one of the channel regions of the microfilm F associated with that frame in which the microfilmed double-size image P2 is eventually formed is brought into register with the imprint window 33 in the aperture plate 10 is counted, followed by the light emitting diode 30 being switched on at step #22. The light emitting diode 30 once switched on at step #22 is switched off at step #24 after, consequent upon the counting of the number of pulses applied to the wind-up motor 35 at step #23, the microfilm F has been wound up the predetermined distance. In this way, the other of the blip markings B associated with the microfilmed double-size image P2 can be imprinted in the corresponding channel region of the microfilm F being transported as shown in FIG. 12.

Thereafter, at successive steps #25 and #26, the number of pulses applied to the wind-up motor 35 is again counted and the wind-up motor 35 is subsequently switched off, completing the advance of the microfilm F over a distance corresponding to the width of that frame in which the microfilmed double-size image P2 is eventually formed. Then, at step #27, the switching solenoid unit 22 is switched off to allow the masking flap 26, then held at the double-size position as shown in FIG. 6(b), to be biased back to the single-size position as shown in FIG. 6(a), with the program flow subsequently returning to step #2.

As hereinbefore described, the microfilm camera 1 according to the present invention is effective to selectively photograph one of the single-size document and the double-size document to eventually form the microfilmed P in either single-size or double-size as shown in FIG. 12 with one blip marking B imprinted for each microfilmed single-size image P1 or with two spaced blip markings B imprinted for each microfilmed double-size image P2.

When the microfilm F bearing a series of microfilmed images P is set in a microfilm reader or a combined reader and printer, the retrieval of any one of the microfilmed double-size images P2 can be advantageously facilitated. As hereinbefore discussed, each of the frames of the microfilm F where the double-size images are respectively microfilmed is given the two blip markings B at leading and trailing positions thereof with respect to the direction of transport of the microfilm F, the trailing position being spaced the predetermined distance from the leading position. Therefore, if the user of the reader or the combined reader and printer is familiar with or advised of the coordination between the number of the imprinted blip markings for each microfilmed image and if the user subsequently inputs an appropriate address value into the retrieval system coupled with the reader or the combined reader and printer, the retrieval system can browse the microfilm F until the count of the blip markings B coincide with the inputted address count, thereby to locate the right one of the microfilmed image which the user desires to view and/or print.

Applying the concept of the present invention to the previously discussed example in which it is assumed that the microfilm bears a series of the single-size image P1 corresponding to page 1 of a book and the double-size images P2 corresponding to the subsequently succeeding pages of the book and that the user wishes to view a microfilmed image of page 9 of the book, the user familiar with the system of the present invention no longer need to undergo a complicated and time-consuming guesswork and all that he or she need to do is to input an address value of 9, which corresponds to the page number of the book, thereby to let the retrieval system to locate the microfilmed image of page 9 of the book.

In describing the preferred embodiment of the present invention with reference to FIGS. 1 to 12, the size sensor 20 has been described as providing a basis on which the switching solenoid unit 22 for driving the masking flap 26 and the light emitting diode 30 of the marking imprint mechanism 29 can be controlled. However, the system may be modified to allow the user to determine the size of a document placed on the document support table 13 by sight and then input one of available values, appropriate to the document size so determined by sight, so that the switching solenoid unit 22 and the light emitting diode 30 can be controlled in a manner unique to the inputted value.

It is to be noted that, although reference has been made to the microfilming of two sizes of documents, one being of a size twice that of the other, the microfilm camera 1 embodying the present invention can work satisfactorily with any document of any size included in any of A-series and B-series as stipulated in the Japanese Industrial Standards (JIS). The microfilm camera embodying the present invention may be so designed as to accommodate either one or both of documents of a size belonging to the A-series and documents of a size belonging to the B-series.

Where the microfilm camera can accommodate both sizes of the documents to be microfilmed such as illustrated, the single-size document area 15 on the document support table 13 may be marked "For B5- and A4-size" and the double-size document area 16 on the same support table 13 may be marked "For B4- and A3-size", and, on the other hand, the masking flap 26 is made controllable in multiple stages, not in two stages, relative to an area of the aperture 24 so that the effective opening of the aperture 24 can correspond to any of the sized included in the A-series and the B-series. In such microfilm camera, the control of the light emitting diode 30 of the marking imprint mechanism 29 is carried out differently for the A-series documents to be microfilmed and for the B-series documents to be microfilmed and, specifically, by utilizing a different preset value based on the number of pulses counted in the manner hereinbefore described, one or two blip markings are imprinted in association with the microfilmed image P.

Also, in describing the foregoing embodiment of the present invention, the two blip markings B have been described and shown as imprinted on the microfilm in association with the microfilmed double-size image P2. However, the microfilm camera 1 may be modified to have a capability of being operated selectively in one of a single-size mode, in which only one blip marking can be imprinted for each frame of the microfilm, and a double-size mode in which two blip marking can be imprinted for each of the microfilm.

In addition, the document support table 13 has been shown and described as employed in the form of a flat table for the support thereon of the document to be microfilmed. The flat support table such as shown and described is specifically versatile in that it can accommodate any type of documents including not only any sheet or paper, but also any book. If desired, however, an automatic document feeder mechanism of any known construction for successively feeding sheets or papers to be microfilmed onto the document support table 13 may be connected to one end of the base. Where the document feeder mechanism is employed, the size sensor 20 may be replaced with, or used in combination with, a sheet size detecting system operable to determine the size of the sheet being delivered onto the support table by detecting the length of time elapsed subsequent to the passage of a leading end of the sheet past a sensing station and after the passage of a trailing end of the same sheet past the same or a different sensing station.

One specific example in which the document feeder mechanism is used in the microfilm camera will now be described in detail with reference to FIGS. 14 to 17. In this alternative embodiment, the microfilm camera 1 employs a camera head 6 of a construction similar or identical with that described in connection with the previously described embodiment. However, instead of the document support table 13, a document support platen 46 forming a part of the automatic document feed mechanism is employed as will become clear from the subsequent description.

Figure 14:
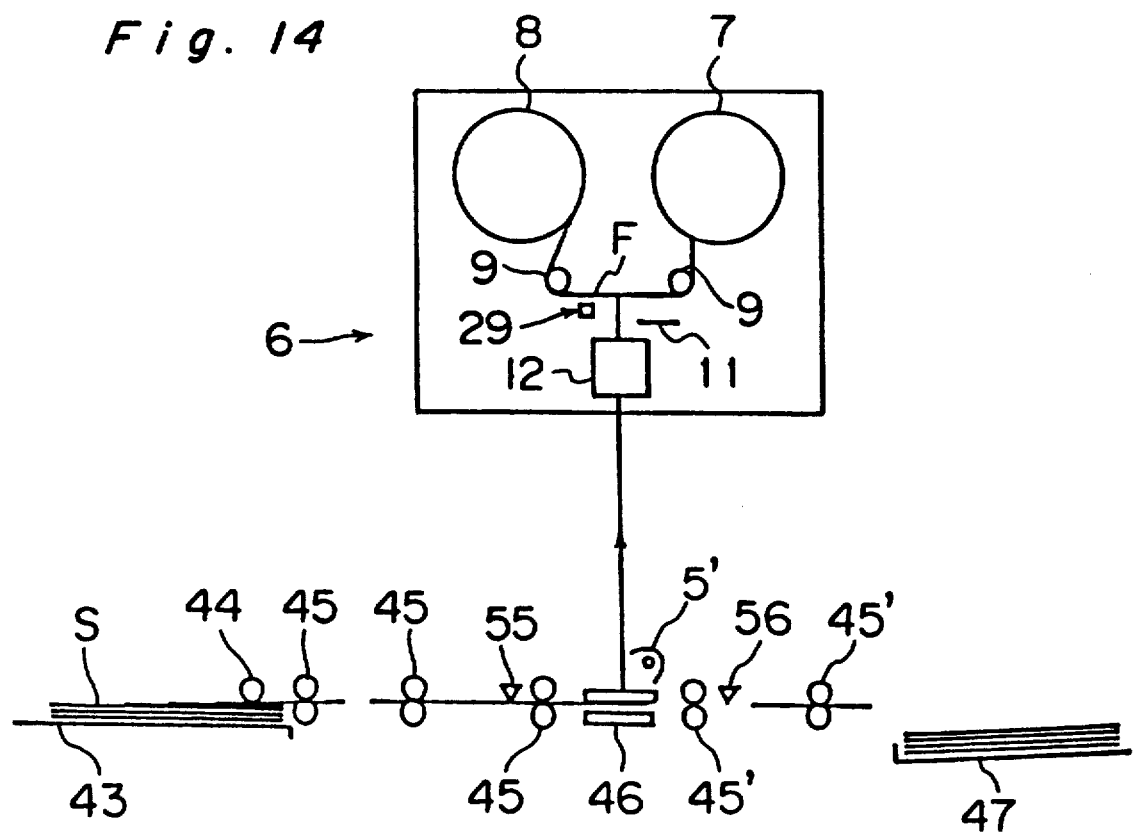
FIG. 14 is a schematic diagram showing the microfilm camera according to an alternative embodiment of the present invention.

Referring particularly to FIG. 14, the automatic document feeder mechanism shown therein is particularly suited for successively feeding sheet-like documents from a document supply mechanism towards a document recovery mechanism past a microfilming station defined in and by the document support platen 46. The document supply mechanism includes a supply tray 43 adapted to accommodate a stack of sheet-like documents S, for example, electrocardiograms and/or electroencephalograms, a feed roller 44 normally biased to contact the uppermost sheet of the stacked documents S and operable to feed the stacked documents S successively and one at a time towards the microfilming station when driven in one direction, and a plurality of guide roller pairs generally identified by 45 and positioned between the document supply tray 43 and the microfilming station so as to define a feed passage extending therebetween.

The document support platen 46 defining the microfilming station comprises a pair of generally rectangular plates positioned one above the other so as to define a sheet passage therebetween. At least one of the plates positioned above the other of the plate must be transparent and is employed in the form of a transparent plate glass, however, both of those plates may be a transparent plate glass.

The document recovery mechanism includes a document recovery tray 47 positioned on one side of the microfilming station opposite to the document supply tray 43 and a plurality of guide roller pairs generally identified by 45' and positioned between the microfilming station and the recovery tray 47 so as to define a recovery passage extending therebetween.

Each of the sheet-like documents S, when supplied onto the microfilming station, is held still in the passage between the plates forming the support platen 46 and is illuminated by an illuminator lamp 5' supported in position diagonally upwardly of the support platen 46.

It is to be noted that the feed of each of the stacked sheet-like documents S from the supply tray 43 towards the recovery tray 47 is synchronized with the transport of the microfilm F from the supply reel 7 towards the wind-up reel 8.

It will readily be seen that the camera head 6 and the document feed mechanism are so synchronized and so operatively associated with each other that, only when one sheet-like document S is brought to the microfilming station, the illuminator lamp 5' is switched on to illuminate such document S and, substantially simultaneously with or shortly after the illumination, the shutter 11 is brought to the open position to allow a frame of the microfilm F then aligned with the aperture 24 in the aperture plate 10 (as discussed with reference to FIG. 7) for a predetermined length of time to be exposed to the incoming imagewise rays of light from the document S in the microfilming station, and that, after the predetermined length of time during which the shutter 11 has been held in the open position, not only is the shutter 11 biased to the intercepting position, but also the microfilm F is advances a predetermined distance corresponding to the width of that frame and, on the other hand, the document S held at the microfilming station is drawn towards the recovery tray 47 while the next succeeding document is fed onto the microfilming station.

The document size detector means employed in the practice of the alternative embodiment of the present invention now under discussion comprises a leading end sensor 55 and a trailing end sensor 56, each of which may be a timer embodied by one of available functions of the microcomputer (MC) 34. The leading end sensor 55 is positioned on an upstream side of the microfilming station with respect to the direction of feed of the documents from the supply tray 43 towards the recovery tray 47 and also upstream of and in the vicinity of one of the guide roller pairs 45 closest to the microfilming station, whereas the trailing end sensor 56 is positioned on a downstream side of the microfilming station with respect to the document feed direction and downstream of and in the vicinity of one of the guide roller pairs 45' closest to the microfilming station.

The leading end sensor 55 is used to detect the passage of a leading end of each document S and the trailing end sensor 56 is used to detect the passage of a trailing end of such document. Respective output signals from the sensors 55 and 56 indicative of the passage of the leading and trailing ends of the single document S are supplied to the microcomputer 34. Therefore, the length of time over which the timer appropriately triggered on during a period subsequent to the detection by the sensor 55 of the passage of the leading end of the document and until the detection by the sensor 56 of the passage of the trailing end of the document performs a count-up operation, can provide an indication of the size of such document.

The document size detector means utilizable in the alternative embodiment may not be always limited to that specific structure as described above, but may be employed in the form of an encoder in combination with the leading and trailing end sensors 55 and 56. In this case, the counting of the number of pulses generated from the encoder during the period subsequent to the detection by the sensor 55 of the passage of the leading end of the document and until the detection by the sensor 56 of the passage of the trailing end of the document can provide an indication of the size of such document. Alternatively, with neither the leading end sensor 55 nor the trailing end sensor 56 being employed, the encoder may be employed solely and, in which case, the encoder may be operatively coupled with a shaft of a guide roller forming one of the guide roller pairs.

Figure 15:
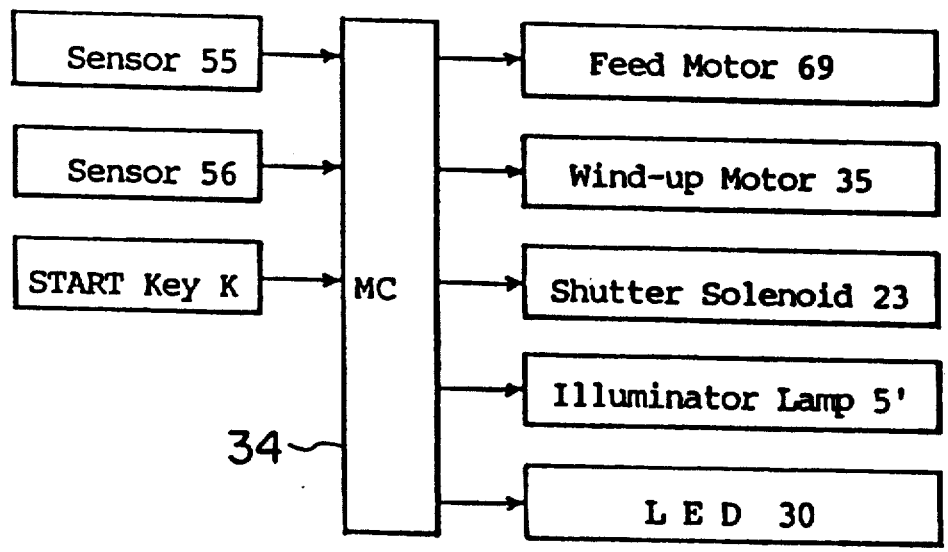
FIG. 15 is a diagram similar to FIG. 10, showing the control means employed in the microfilm camera shown in FIG. 14.

The control means employed in the practice of this alternative embodiment is shown in FIG. 15. As shown therein, the leading and trailing end sensors 55 and 46 and the START key K (described in connection with the first embodiment) are electrically connected with the microcomputer 34. On the other hand, the microcomputer 34 controls not only the wind-up motor 35, the shutter solenoid unit 23, the illuminator lamp 5' and the light emitting diode 30 of the marking imprint mechanism 29 as is the case with the previously described embodiment, but also a document feed motor 69 used to drive the feed roller 44 and drive rollers forming respective parts of the guide roller pairs 45 and 45'. The sequence of operation of this control means shown in FIG. 15 will subsequently be described with reference to FIG. 16.

Figure 8:
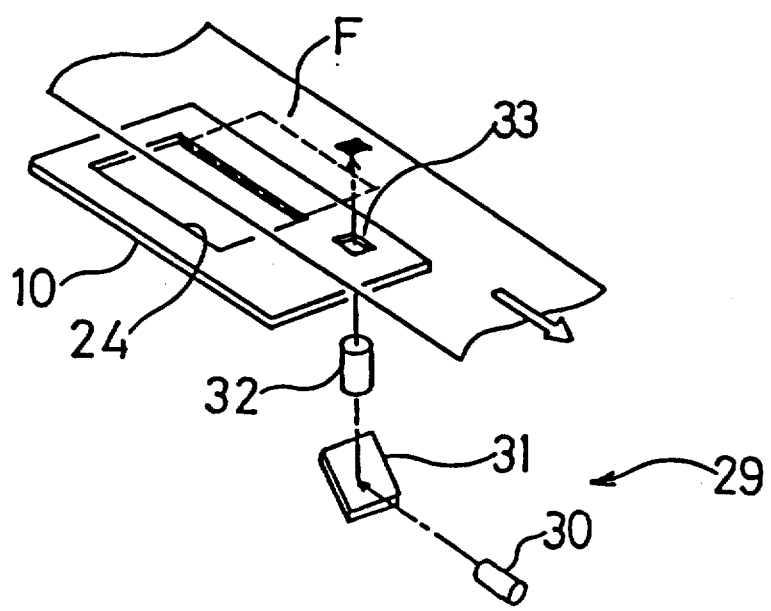
FIG. 8 is a schematic perspective view showing a marking imprint mechanism.
Figure 17:
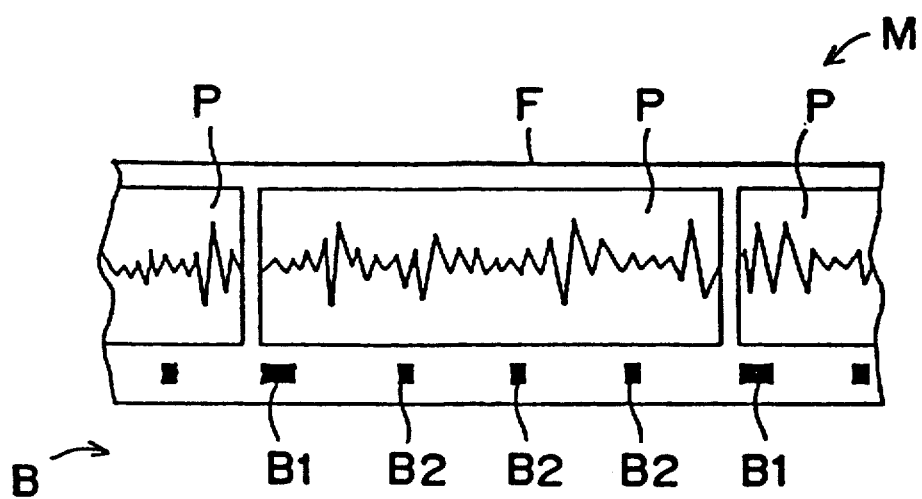
FIG. 17 is a schematic diagram showing a portion of images photographically recorded on the microfilm with the microfilm camera of FIG. 14.

The microfilm camera 1 according to this alternative embodiment makes use of the marking imprint mechanism 29 shown in and described with particular reference to FIG. 8. However, the marking imprint mechanism 29 used in the practice of the alternative embodiment is used to imprint a single blip marking B at the specific position, shown in and described with reference to FIG. 12, in the event that the sheet-like document is of a relatively small length, but a plurality of blip markings as shown in FIG. 17 in the event that the sheet-like document is of a relatively great length. It is to be noted that, in the example shown in FIG. 17, the blip marking identified by B1 in FIG. 17 is imprinted at the leading position on the microfilm F with respect to the direction of transport of the microfilm as is the case with the position at which the single blip marking is imprinted in the case of the sheet-like document of a relatively small length, while all those blip markings B1 and B2 are spaced a predetermined distance from each other in a direction parallel to the direction of transport of the microfilm F.

The determination of whether the sheet-like document is of a relatively small length or whether the sheet-like document is of a relatively great length may be carried out in reference to, for example, the size of the display screen of the reader or the combined reader and printer with which the microfilmed images are viewed, and, where the microfilming magnification is chosen to be 1/24, and A4-size sheet may be utilized as a criterion. Also, the spacing between each neighboring imprinted blip markings B may be chosen in consideration of the width of the display screen and, in such case, may be about 8 mm as measured on the microfilm F bearing the series of microfilmed images.

It is also to be noted that, in the alternative embodiment shown in FIGS. 14 and 17, the light emitting diode 30 of the marking imprint mechanism 29 is so controlled as to provide eventually the imprinted blip markings of varying size, for example, large, medium and small. This can be accomplished by varying the length of time during which the light emitting diode 30 is switched on, in response to a drive signal issued from the microcomputer 34 on the basis of the result of detection made by the document size detector means. So far shown in FIG. 17, the blip marking B1 imprinted on the leading position adjacent a leading end of the frame bearing the microfilmed image P with respect to the direction of transport of the microfilm F has a size greater than that of any one of the blip markings B2 imprinted at respective spaced positions within the coverage of such frame.

Figure 16:
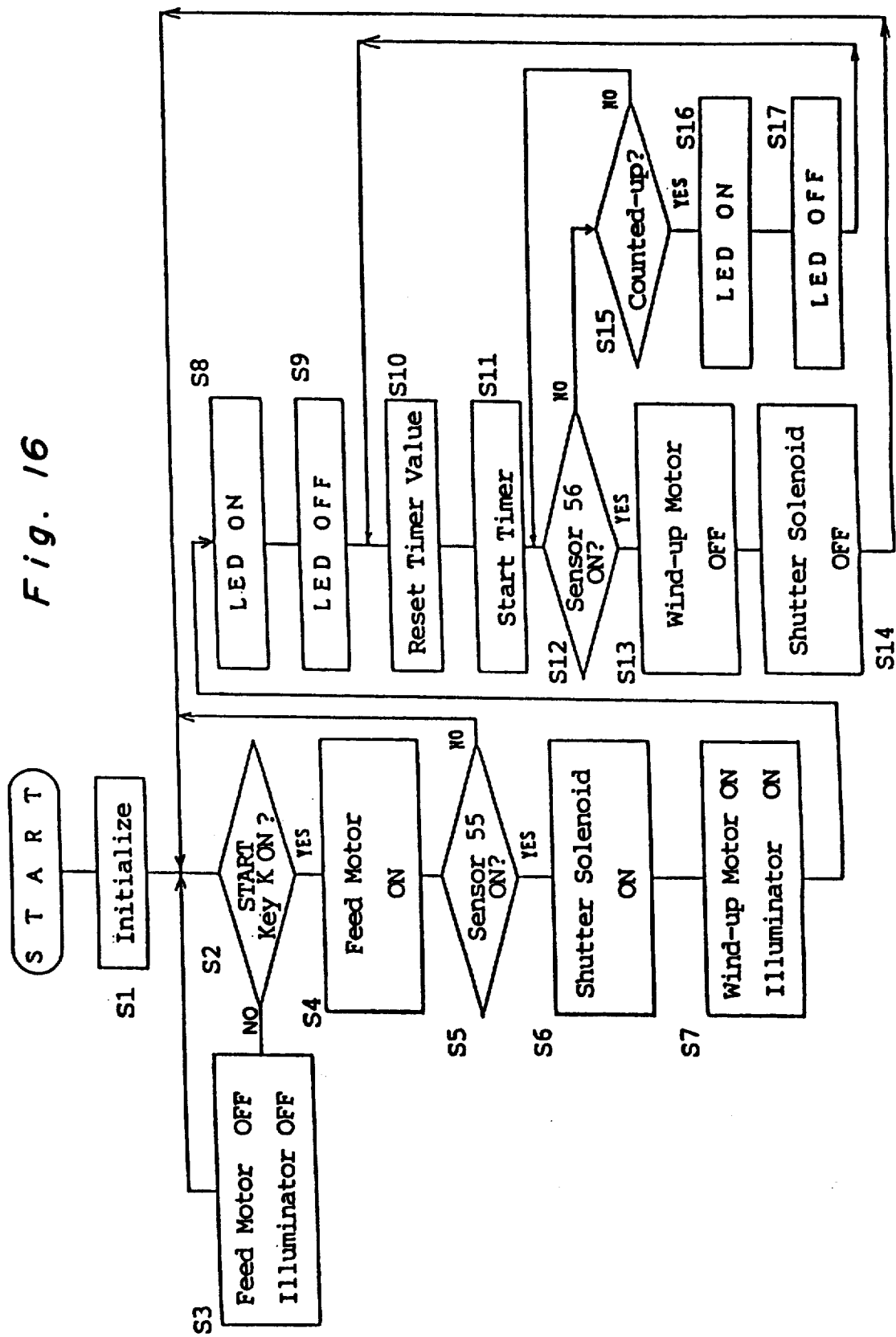
FIG. 16 is a flowchart showing the sequence of control performed by the control means shown in FIG. 15.

The sequence of operation of the control means will now be described with reference to FIG. 16. Subsequent to the power switch having been turned on, initialization takes place at step S1. After the initialization, a decision is made at step S2 to determine if the START key K has been switched on. Unless the operator switches on (or depresses) the START key K, the document feed motor 69 and the illuminator lamp 5' are held switched off at step S3, allowing the flow to return to the decision step S2.

On the other hand, if the START key K has been switched on, the document feed motor 69 is powered at step S4 to drive the feed roller 44 and the drive rollers forming the guide roller pairs 45 and 45', thereby allowing the uppermost sheet of the documents S stacked on the supply tray 43 to be fed towards the microfilming station. Then, at step S5, another decision is made to determine if the leading end of the sheet-like document has moved past the leading end sensor 55, and the program flow returns to step S2 in the event that the decision at step S5 indicates that the leading end of the document S has not yet moved past the leading end sensor 55.

Should the decision step S5 indicate that the leading end of the document S has moved past the leading end sensor 55, the shutter solenoid unit 23 is switched on to bring the shutter 11 in the open position and, then at step S7, not only is the wind-up motor 35 switched on to effect the transport of the microfilm F from the supply reel 7 towards the wind-up reel 8, but the illuminator lamp 5' is also switched on, allowing the frame of the microfilm F aligned with the aperture 24 in the aperture plate 10 to be exposed to the incoming imagewise rays of light reflected from the document then held at the microfilming position sandwiched between the plates forming the support platen 46. In this way, the sheet-like documents S are successively photographed on the microfilm F to eventually form the associated microfilmed images P.

Simultaneously with the photographing, the blip marking is imprinted in the following manner. Specifically, at successive steps S8 and S9, the light emitting diode 30 of the imprint mechanism 29 is switched on and then off, respectively, to imprint a blip marking B on the specific location on the microfilm F adjacent the leading end of the frame which has been exposed to the incoming imagewise rays of light. At subsequent steps S10 and S11, the timer is reset and started, respectively, and, at step S12, a decision is made to determine if the trailing end sensor 56 has detected the passage of the trailing end of the document S. In the event that, as a result of the decision at step S12, it is indicated that the passage of the trailing end of the document S has been detected immediately by the sensor 56, the program flow goes to steps S13 and S14 at which the wind-up motor 20 and the shutter solenoid 21 are switched off, respectively, to interrupt the transport of the microfilm F and to bring the shutter 11 back to the intercepting position. In other words, where the frame of the microfilm F bears the microfilmed image of the document of a relatively small length, only one blip marking B1 is imprinted at the specific position. Thereafter, the program flow returns to step S2, in readiness for the photographing of the next succeeding document.

On the other hand, if the decision at step S12 indicates that the trailing end sensor 56 has not yet detected the passage of the trailing end of the document S, step S15 takes place at which another decision is made to determine if the timer has counted up, that is, if a predetermined time preset in the timer started at step S11 has elapsed. If the decision at step S15 indicates "NO", the program flow returns to step S12, but if it indicates "YES", the document of which the trailing end has been detected by the sensor 56 is deemed to be of a relatively small length and, therefore, only one blip marking B1 is imprinted at the specific position for that frame of the microfilm F, with the program flow subsequently returning to step S2 via successive steps S13 and S14.

In contrast thereto, should the decision at step S15 indicate that the timer has counted up before the trailing end sensor 16 is switched on, the program flow goes to steps S16 and S17. During the execution of the flow of steps S16 and S17, the light emitting diode 22 is switched on and, after a predetermined length of time, switched off, respectively, to imprint the blip marking B2 of smaller size than the blip marking B1. In other words, in the case of the eventually formed microfilmed image P of the document of a relatively great length, the photographing continues even after the passage of a predetermined length of time and, therefore, the blip marking B2 of smaller size is imprinted at a location spaced a predetermined distance rearwardly of the blip marking B1 with respect to the direction of transport of the microfilm F. After the imprinting of the blip marking B2, the program flow returns to step S10 and then to step S11 at which the timer is again started, followed by step S12. During the subsequent execution of the flow from step S15 to step S17, another blip marking B2 of smaller size is imprinted at a position spaced rearwardly from the previously described blip marking B2 of smaller size. This flow may be repeated to imprint a required number of blip markings appropriate to the actual length of the document. So far shown in FIG. 17, three blip markings B2 of smaller sizes are shown to have been imprinted. Thereafter, the program flow returns to step S2 via successive steps S13 and S14.

The microfilm camera 1 according to the embodiment shown in and described with reference to FIGS. 14 to 17 is such that the document can be microfilmed on a corresponding frame of the microfilm F intermittently transported in synchronism with the supply of the document S and, in the event that such document is of a relatively great length as determined by a result of detection made by the leading and trailing end sensors 55 and 56 forming the size detector means, the plural blip markings are imprinted on the microfilm in association with such frame where the microfilmed image P of such document is eventually formed.

Accordingly, even the alternative embodiment can provide structural and operational advantages and effects similar to those described in connection with the first described embodiment of the present invention.

Although the present invention has been described in connection with the preferred embodiments thereof with reference to the accompanying drawings, it is to be noted that various changes and modifications are apparent to those skilled in the art. By way of example, with respect to the marking imprint mechanism 29, it has been described that, by controlling the light emitting diode 30 with passage of time, one or two blip makings of a predetermined size are imprinted on the predetermined locations on the microfilm. However, the marking imprint mechanism 29 may not always be limited to the type shown and described, but may include a plurality of light emitting diodes or lamps spaced a predetermined from each other a predetermined distance corresponding to the span between each neighboring frames of the microfilm, so that, by selectively energizing one or some of the light emitting diodes or lamps, necessary blip markings can be imprinted.

Accordingly, such changes and modifications are to be understood as included within the scope of the present invention, as defined by the appended claims, unless they depart therefrom.

What is claimed is:

1. A microfilm camera which comprises:
   photographing means for photographing an image of a document to be microfilmed on a microfilm;
   marking means for imprinting a marking on the microfilm indicative of a position of the image of the document which has been photographed by the photographing means;
   determining means for determining a size of the document to be microfilmed; and
   control means for controlling the marking means so that, in the event that the determining marking indicates that the document is of a size larger than a predetermined size, said marking means imprints a plurality of markings at intervals corresponding to said predetermined size.

2. The microfilm camera as claimed in claim 1, wherein said photographing means has a capability of photographing a document of a first size and a document of a second size which is substantially twice the first size, and wherein said control means controls the marking means so that, in the event that the determining means indicates that the document to be photographed is of the second size, the marking means imprints the markings indicative of positions of respective halves of the microfilm in association with the image of the document which has been photographed.

3. The microfilm camera as claimed in claim 2, further comprising a document support for supporting thereon any one of the documents of the first and second sizes, said document support having a first document area adapted to accommodate the document of the first size and a second document area adapted to accommodate the document of the second size, and size detecting means disposed in the document support at a location outside the first document area and within the second document area for detecting whether or not the document of the second size is placed on the document support, and wherein said determining means determines, when said size detecting means detects the presence of the document on the document support, that the document of the second size has been placed thereon.

4. The microfilm camera as claimed in claim 3, wherein said marking means has a capability of imprinting markings in different sizes, and wherein said control means controls the marking means so that the marking means imprints the markings of different sizes indicative of positions of respective halves of the microfilm in association with the image of the document which has been photographed.

5. The microfilm camera as claimed in claim 1, wherein said control means controls the marking means so that the marking means imprints the plural markings spaced at intervals of a predetermined distance from each other.

6. The microfilm camera as claimed in claim 5, wherein said marking means has a capability of imprinting markings in different sizes, and wherein said control means controls the marking means so that the marking means imprints the markings on the microfilm in association with the image of the document which has been photographed, one of said markings, which is imprinted the first time, being of a size different from that of the subsequently imprinted markings.

7. A microfilm camera which comprises:
   a document feed mechanism for successively feeding a plurality of documents to be microfilmed one at a time towards a microfilming station;
   photographing means for photographing an image of the document, which has been fed to the microfilming station, on a microfilm;
   marking means for imprinting a marking on a non-image area of the microfilm indicative of a position of the image of the document which has been photographed by the photographing means, said non-image area of the microfilm being peripheral to a frame bearing the microfilmed image of the document;
   determining means for determining a length of the photographed image on the microfilm, said length of the photographed image being measured in a direction parallel to a direction of feed of the microfilm; and
   control means for controlling the marking means so that, in the event that the determining means indicates that the document is of a length greater than a predetermined size, said marking means imprints a plurality of markings at intervals corresponding to said predetermined size.

8. The microfilm camera as claimed in claim 7, said control means controls the marking means to cause the latter to imprint one marking for each predetermined length.

9. The microfilm camera as claimed in claim 8, wherein said determining means determines the length of the photographed image on the basis of the length of the document, as measured in the direction parallel to the direction of feed of the document, which is fed by the document feed mechanism.

10. The microfilm camera as claimed in claim 9, wherein said document feed mechanism includes a detector for detecting the presence or absence of the document at a predetermined position, and wherein said determining means determines that the length of the photographed image is greater than a predetermined length in the event that said detector fails to detect a passage of a trailing end of the document within a predetermined time subsequent to said detector having detected a passage of a leading end of the document, said trailing and leading ends being in relation to the direction of feed of such document by the document feed mechanism.

11. The microfilm camera as claimed in claim 9, wherein said document feed mechanism includes a detector for detecting the presence or absence of the document at a predetermined position, and wherein said determining means determines that the length of the photographed image is greater than a predetermined length in the event that said detector fails to detect a passage of a trailing end of the document even though a predetermined amount of documents have been fed subsequent to said detector having detected a passage of a leading end of the document, said trailing and leading ends being in relation to the direction of feed of such document by the document feed mechanism.

12. A microfilm which comprises:
   at least one image area in which an image of a document is recorded, said image area having a length; and
   a plurality of markings imprinted on a non-image area peripheral to the image area and spaced a predetermined length from each other, said plurality of the markings being imprinted when the length of the image area is greater than said predetermined length.

13. The microfilm as claimed in claim 12, wherein one of the markings, which is imprinted the first time, is of a size different from that of any one of the subsequently imprinted marking or markings.

* * * * *

UNITED STATES PATENT AND TRADEMARK OFFICE
CERTIFICATE OF CORRECTION

PATENT NO. : 5,202,724
DATED : April 13, 1993
INVENTOR(S) : Koichi Nagata, et al.

It is certified that error appears in the above-identified patent and that said Letters Patent is hereby corrected as shown below:

In Col. 4, line 2, change "presence" to --absence--.

In Col. 5, line 42, change "place" to --piece--.

In Col. 18, line 27 (Claim 1, line 11), change "determining marking" to --determining means--.

In Col. 19, line 4 (Claim 6, line 2), change "sad" to --said--.

Signed and Sealed this

Fourteenth Day of December, 1993

Attest:

BRUCE LEHMAN

Attesting Officer    Commissioner of Patents and Trademarks